Figure 1:
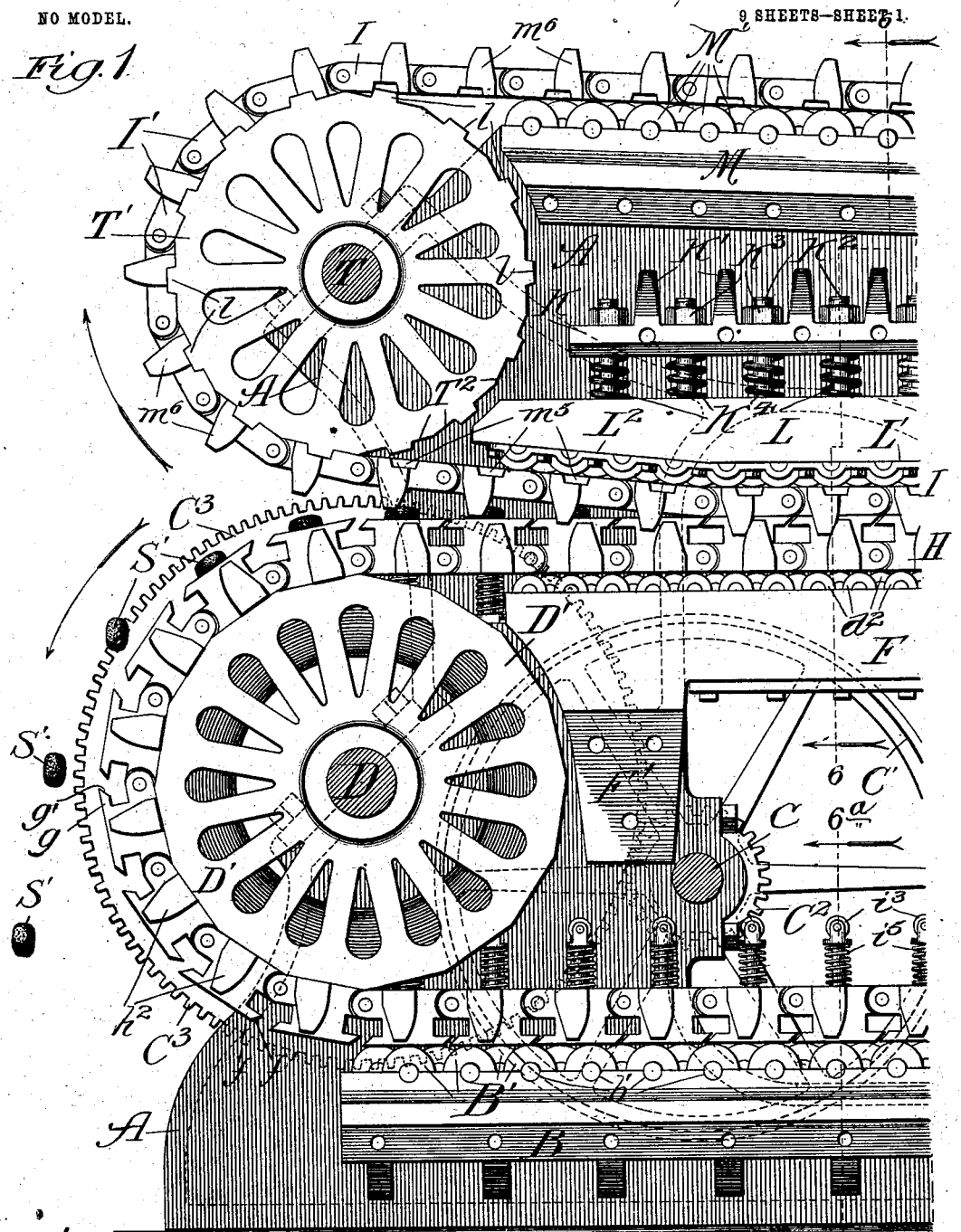

No. 724,588. PATENTED APR. 7, 1903.
W. A. KÖNEMAN.
BRIQUETING MACHINE.
APPLICATION FILED JULY 30, 1902.
NO MODEL. 9 SHEETS—SHEET 1.

No. 724,588. PATENTED APR. 7, 1903.
W. A. KÖNEMAN.
BRIQUETING MACHINE.
APPLICATION FILED JULY 30, 1902.
NO MODEL. 9 SHEETS—SHEET 2.

Witnesses: Inventor:
William A. Köneman,
By Dynenforth, Dynenforth & Lee,
Att'ys.

No. 724,588. PATENTED APR. 7, 1903.
W. A. KÖNEMAN.
BRIQUETING MACHINE.
APPLICATION FILED JULY 30, 1902.
NO MODEL. 9 SHEETS—SHEET 3.

No. 724,588. PATENTED APR. 7, 1903.
W. A. KÖNEMAN.
BRIQUETING MACHINE.
APPLICATION FILED JULY 30, 1902.
NO MODEL. 9 SHEETS—SHEET 6.

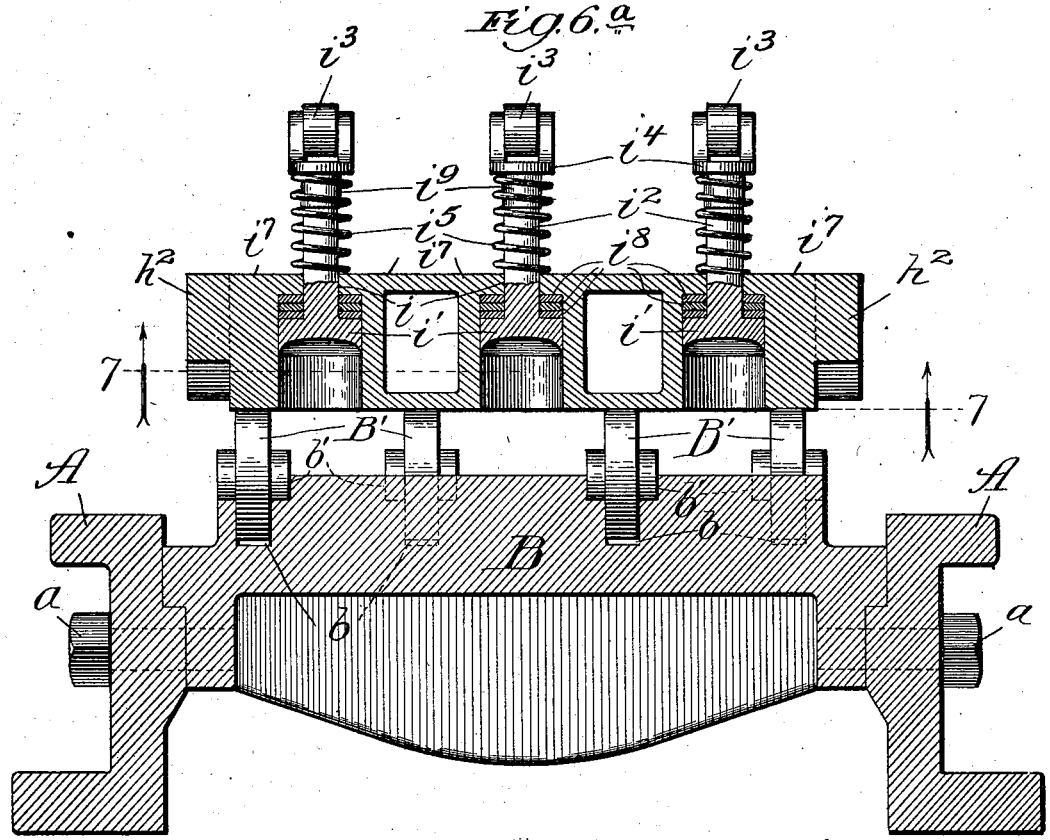
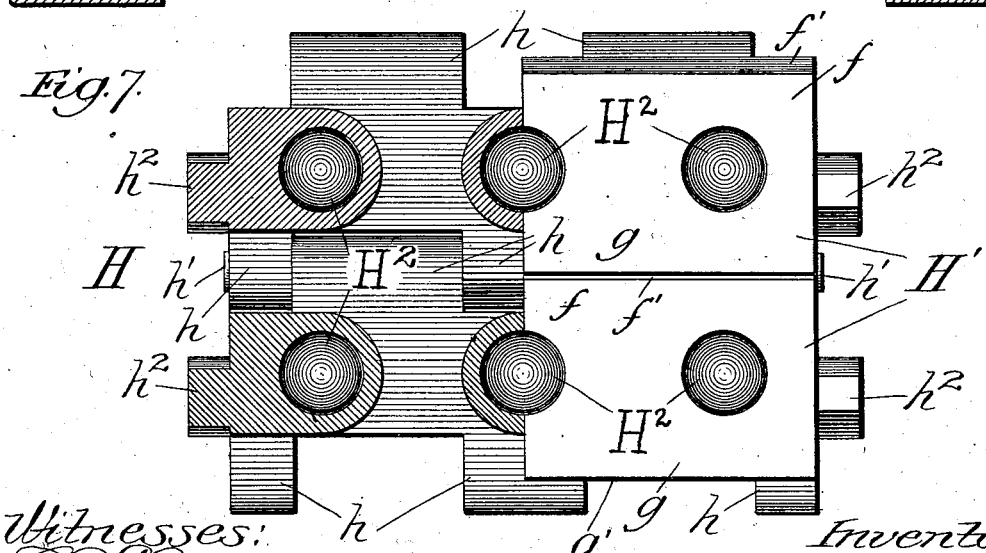

No. 724,588. PATENTED APR. 7, 1903.
W. A. KÖNEMAN.
BRIQUETING MACHINE.
APPLICATION FILED JULY 30, 1902.
NO MODEL. 9 SHEETS—SHEET 8.
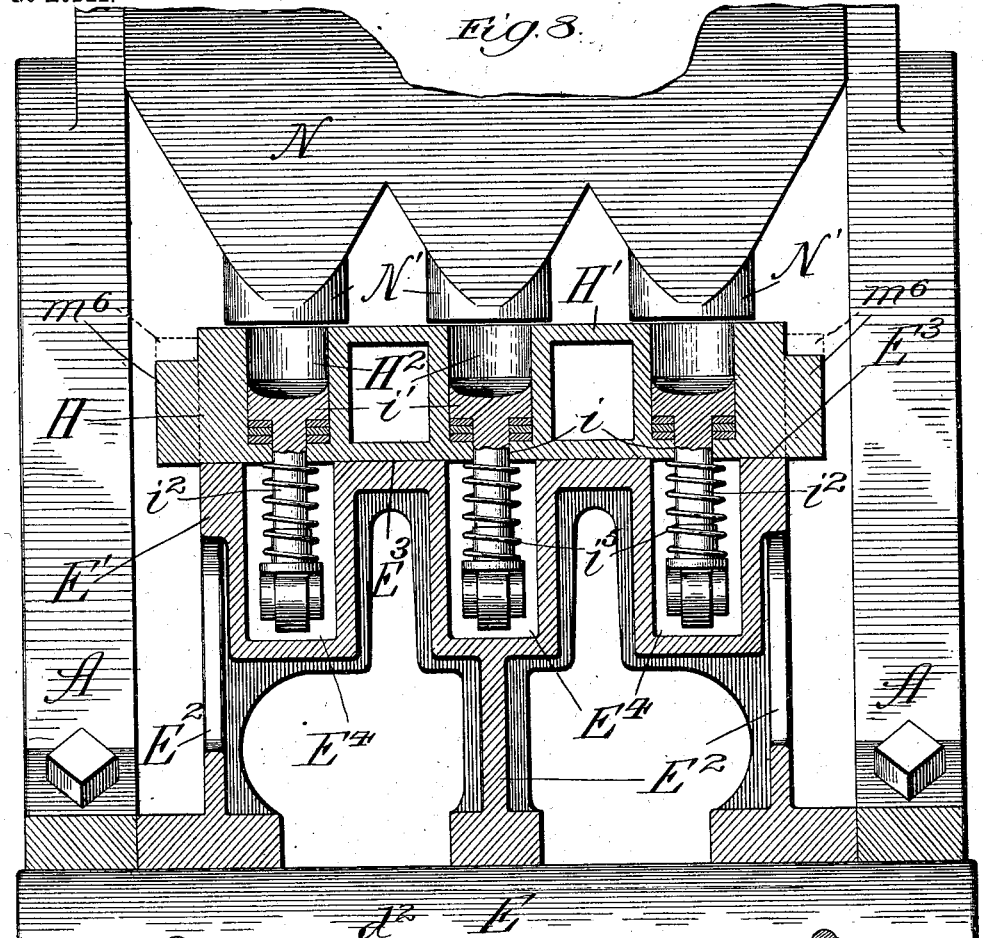
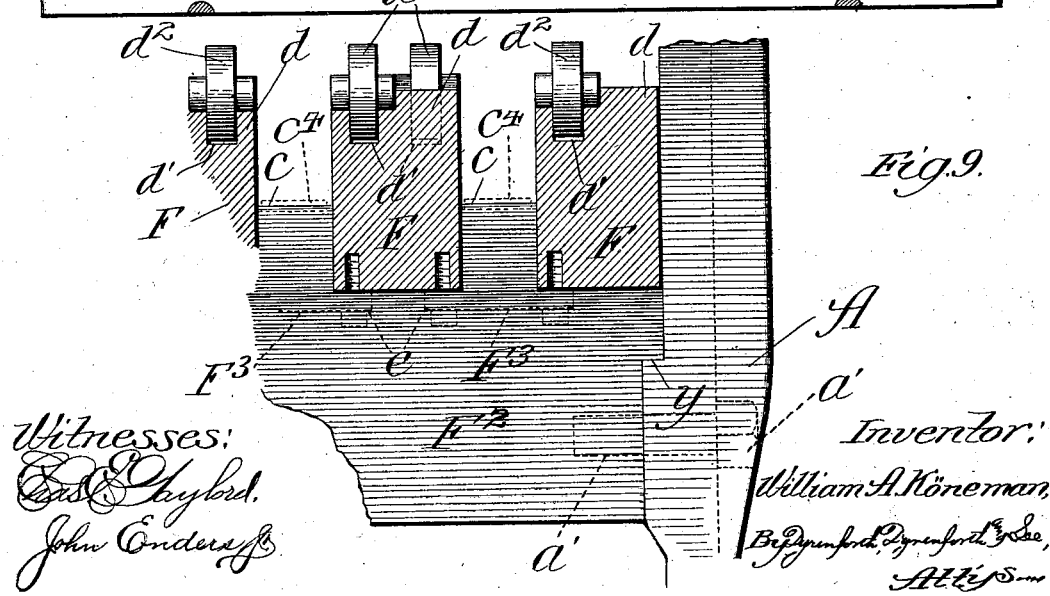

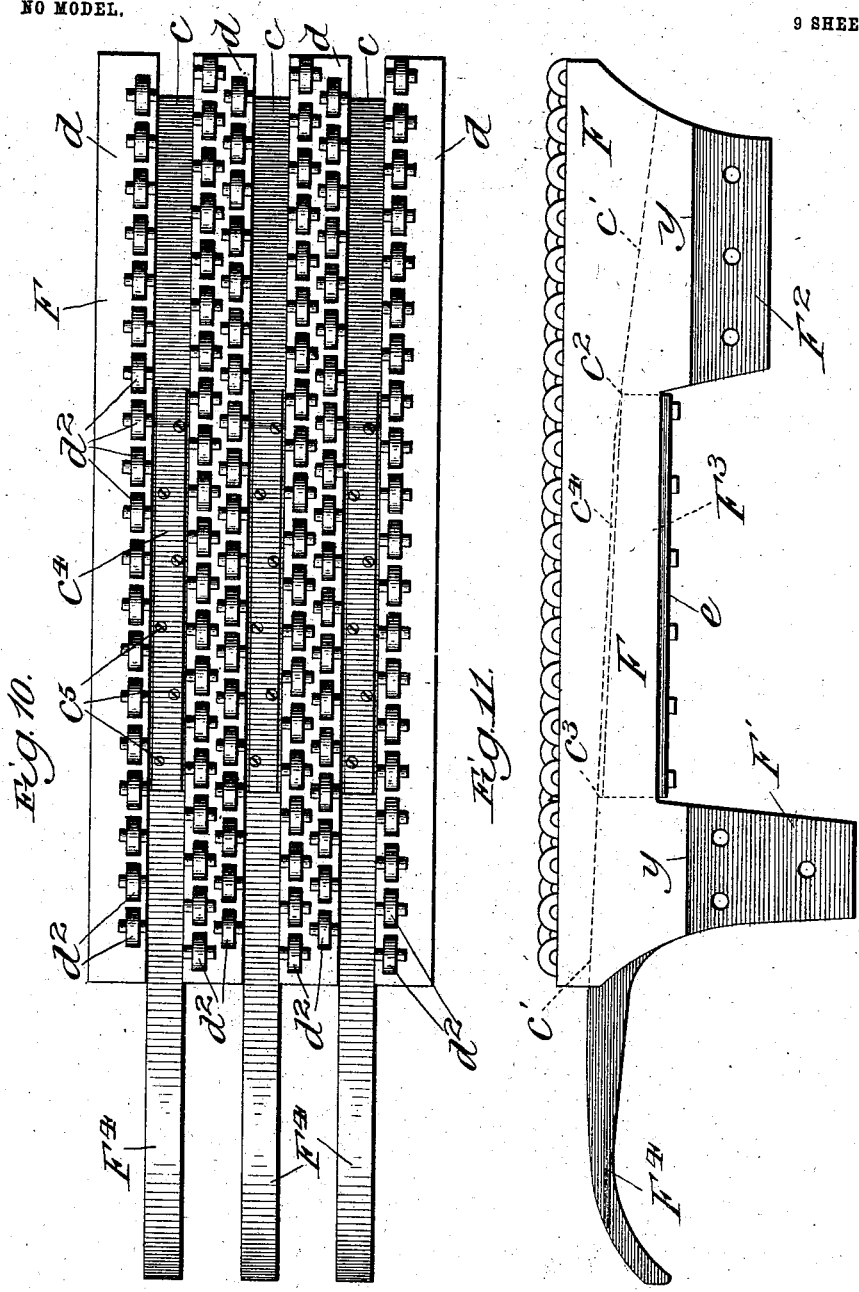

UNITED STATES PATENT OFFICE.

WILLIAM A. KÖNEMAN, OF CHICAGO, ILLINOIS, ASSIGNOR TO INTERNATIONAL FUEL COMPANY, OF CHICAGO, ILLINOIS, A CORPORATION OF NEW JERSEY.

BRIQUETING-MACHINE.

SPECIFICATION forming part of Letters Patent No. 724,588, dated April 7, 1903.

Application filed July 30, 1902. Serial No. 117,649. (No model.)

*To all whom it may concern:*

Be it known that I, WILLIAM A. KÖNEMAN, a citizen of the United States, residing at Chicago, in the county of Cook and State of Illinois, have invented a new and useful Improvement in Briqueting-Machines, of which the following is a specification.

My invention relates to improvements in machines for forming briquets from granular or pulverulent material—such as culm or coal-dust, finely-divided ore, or the like—and while my improved machine as herein illustrated is designed more especially for the production of certain fuel-briquets my present invention is not to be limited thereto.

The fuel-briquets referred to are formed under pressure from pulverized anthracite, bituminous, or other coal, or a mixture of different coals in a pulverized state, with which is intimately associated a more or less small proportion of liquid or semiliquid agglutinating material. The briquets when finished should be sufficiently hard and compact to withstand disintegration in shipment and handling, and to obtain these results I have found it necessary to provide against difficulties which are not present in the manufacture of bricks, &c., from plastic or semiplastic coal or the like, and therefore do not have to be overcome in the use of ordinary brick-making machines.

When a briquet such as described is formed by quick compression, as is usual in brick-machines, it is apt after leaving the machine to develop flaws which tend to weaken it, so that it will not remain intact under ordinary rough handling. The principal reason for this is that the loose pulverulent mass as it is necessarily fed to the compressing-molds contains a large percentage of atmospheric air, which cannot escape therefrom rapidly enough while quick compression is being performed in machines as hitherto usually provided. The air contained in the mass of pulverized material is compressed therewith and confined thereby, and after the briquet is formed the air expands with force sufficient to produce the flaws mentioned.

My object is to provide a machine of generally improved construction in which the compressing operation will be performed in a manner to insure the production of uniformly compact and flawless briquets.

It is also my object to provide a machine which will have large capacity and comparatively small power requirements, which shall be comparatively inexpensive to construct, maintain, and operate, and which shall be particularly well adapted for the purpose of making briquets such as referred to.

In carrying out my invention I provide mechanism for effecting comparatively slow, gradual, and positive compression of the briquet material with facilities for insuring the escape of air mixed with the material, all the working parts being readily accessible and of great strength and durability.

Figure 2:
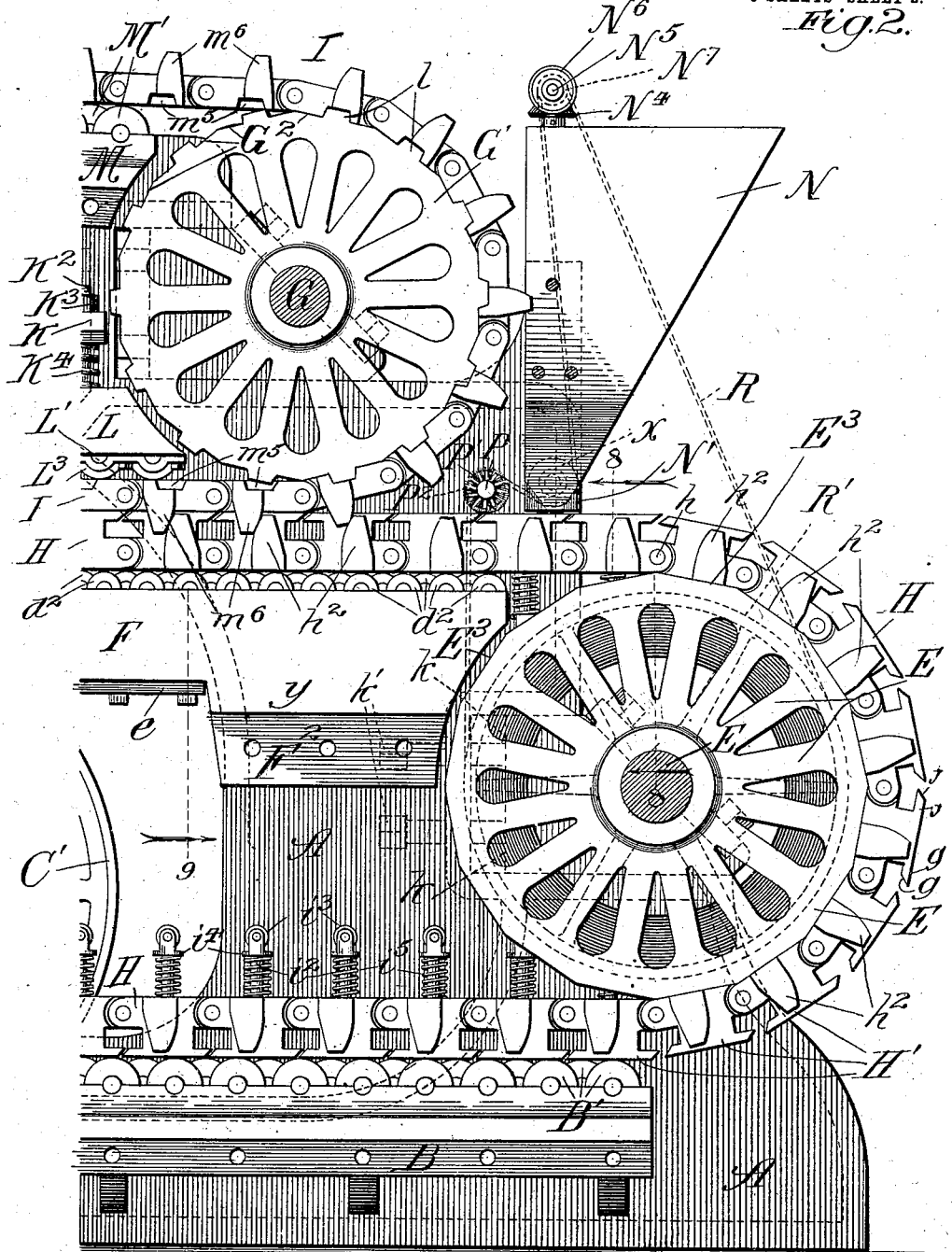
Figure 3:
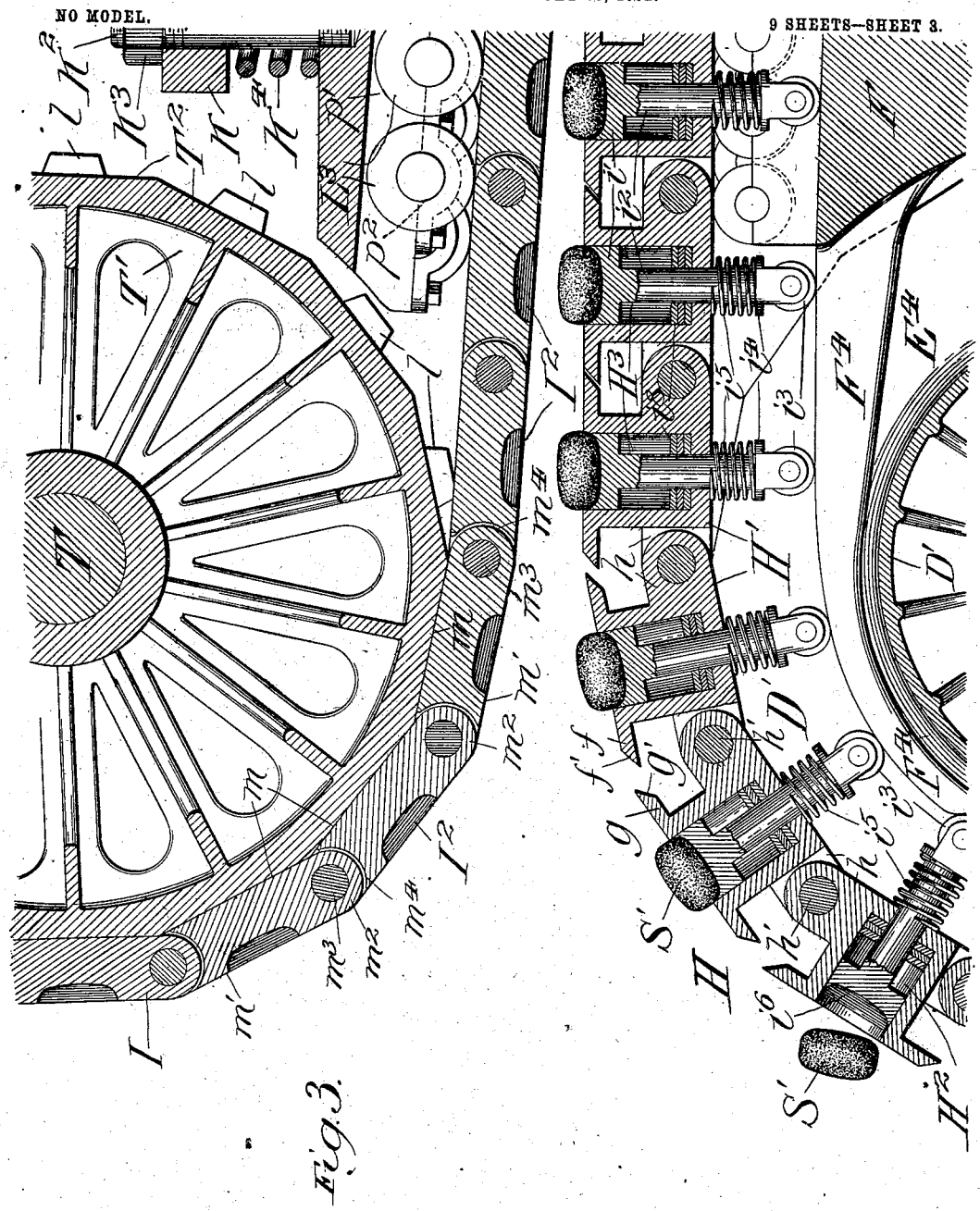
Figure 4:
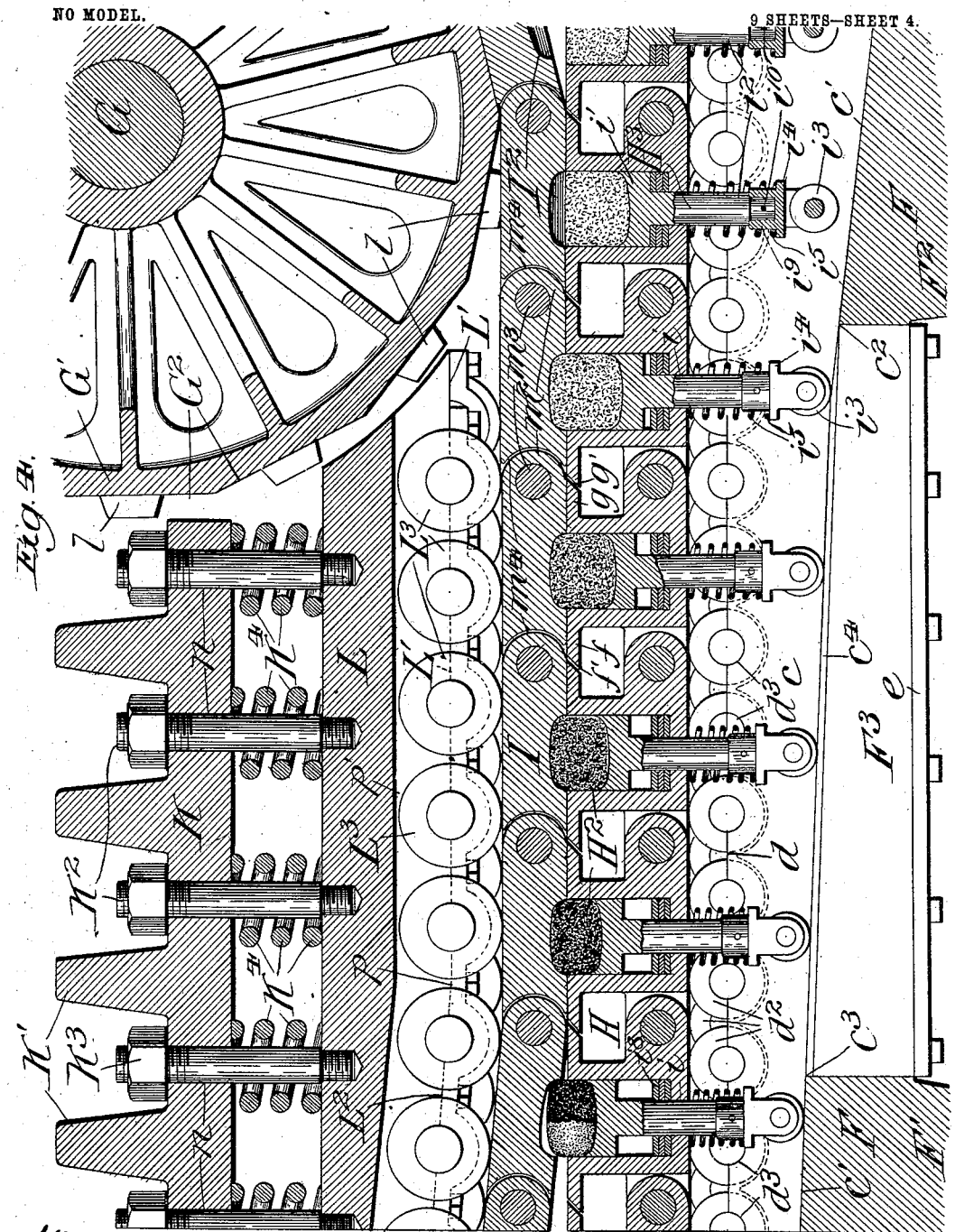
Figure 5:
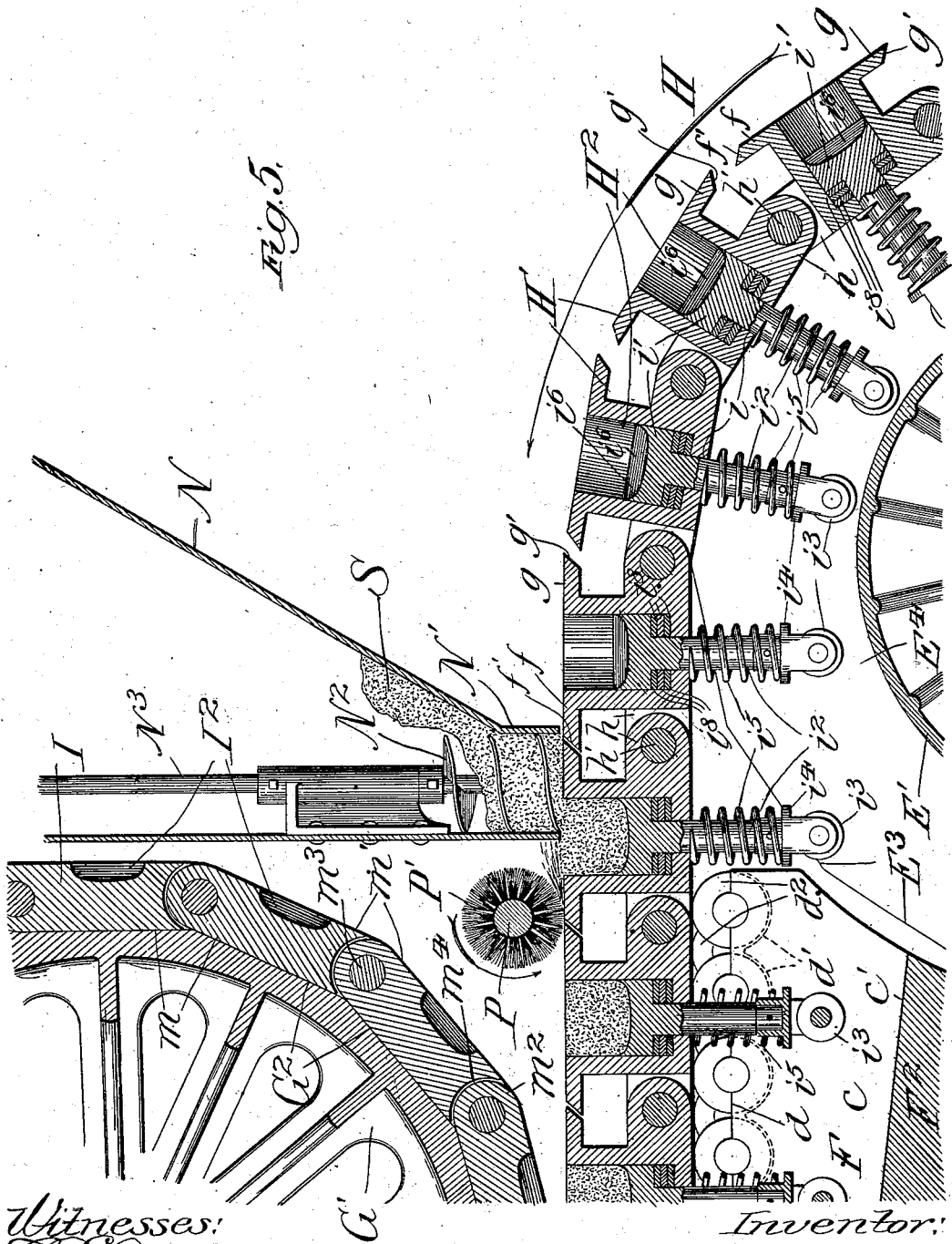
Figure 6:
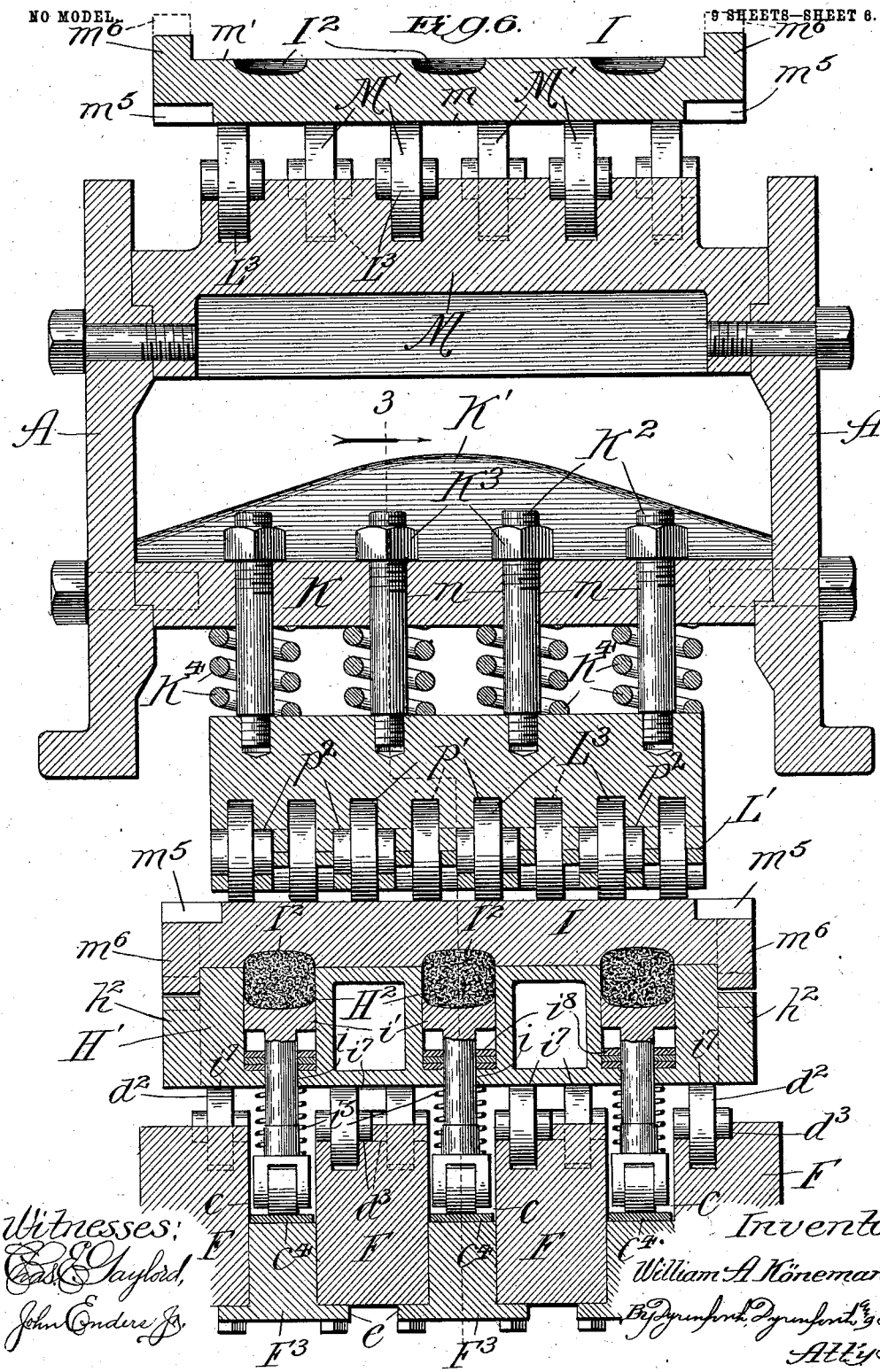

In the drawings, Figures 1 and 2 taken together form a sectional side elevation of the entire machine, the section being taken just within one of the side frames or cheeks of the machine. Figs. 3, 4, and 5 taken together form an enlarged broken longitudinal section through the machine on line 3 in Fig. 6; Figs. 6 and 6ª, sections taken, respectively, on the irregular line 6 and line 6ª in Fig. 1; Fig. 7, a plan and sectional view taken on line 7 7 in Fig. 6ª; Figs. 8 and 9, views taken, respectively, on lines 8 8 and 9 in Fig. 2 and viewed as indicated by the arrows; Fig. 10, a plan view of a bed across which the molds move in the briquet-forming operation, and Fig. 11 a side view of the features shown in Fig. 10.

A A are the side frames or cheeks of the machine, suitably constructed for strength and to afford side supports for parts and bearings for shafts, all as hereinafter described.

Fitting between the cheeks A in the lower part of the machine is a bed B, extending longitudinally of the frame and securely fastened in place by bolts *a*, extending through the cheeks A. In the bed B are four parallel longitudinally-extending series of sockets *b*, (see Fig. 6ª,) formed with recesses *b'* in opposite sides, presenting journal-bearings for longitudinal series of closely-adjacent bearing-rollers B', the said rollers forming an antifriction-bed. Journaled in bearings on the side cheeks is a drive-shaft C, carrying a drive-pulley C' and a pinion C². Also journaled in bearings on the cheeks are shafts D, E, T, and G in the relative positions shown. Beyond one side the shaft D carries a large gear-wheel C³, which meshes with and is driven from the pinion C². On the shaft D and suitably secured thereto is a drum D', having a peripheral polygonal surface formed of a number of adjacent flat faces of equal width around the drum. On the shaft E is a similar drum E', (shown one-half in section in Fig. 8,) and as the drums D' E' are exactly similar in construction a description of the drum E' will suffice for both. The drum is upon outer and central spiders E², having hubs fitting the shaft E. In the many-sided peripheral face E³ are three circumferential sockets E⁴, one at the center over the central spider E² and the others toward opposite ends of the drum.

F is a bed extending above the bed B between the drums D' E'. The bed has attaching leg portions F' F² at opposite ends formed with shoulders $y$, which rest, as shown in Fig. 9, on shoulders in the cheeks A, and the bed is firmly secured in place by bolts $a'$. The upper surface of the bed F is flat and provided with three longitudinally-extending recesses or grooves $c$, leaving the four plane horizontal surfaces $d$, as shown in Fig. 10. The bases $c'$ of the recesses $c$ are inclined to present inclined planes, as shown, and between the points $c^2$ $c^3$ in Fig. 11 the metal of the base F is cut away to present openings, which are fitted with blocks F³. The blocks are formed in cross-section, as shown in Fig. 6, with flanges $e$, which fit against the under surfaces of the bed F and are bolted thereto to hold the blocks firmly in place. On the upper surfaces of the blocks F³ are removable and replaceable wearing-plates $c^4$, presenting inclined planes for a purpose hereinafter described. In the faces $d$ of the bed F are longitudinal series of recesses $d'$ to receive antifriction bearing-rollers $d^2$, journaled in opposite sides of the sockets in recesses $d^3$, as shown most plainly in Figs. 6 and 9. The outer faces $d$ $d$ of the bed are provided each with one row or series of antifricton-rollers $d^2$, while the intermediate faces $d$ $d$ are provided each with two rows or series of antifriction-rollers $d^2$. Integral with the bed F are three backward-extending arms F⁴, which register with the grooves $c$ and at their free ends are curved in the downward direction, as shown, to extend in the sockets E⁴ of the drum D' over and down to or nearly to the horizontal plane of the shaft D. The upper surfaces of the arms F⁴ form inclined-plane continuations of the surfaces $c'$.

H is an endless belt or chain formed of slats or links H'. As the links H' are all construted alike, a description of one will answer for all. Each link is of a length somewhat exceeding the distance between the outer rows of wheels $d^2$, as shown in Fig. 6. At the upper edges of the link are a forward-extending flange $f$, presenting an inclined edge $f'$, and at the opposite or rear upper edge of the link is a backward-extending flange $g$, having an inclined edge $g'$ to overlap the edge $f'$ of the next adjacent link. Thus the links overlap each other where the belt H extends in a straight line. At the lower opposite sides of the links are forward and backward extending intermeshing perforated projections $h$, at which the links are pivotally connected together by means of pins $h'$. In each link H' in the construction shown are three mold-sockets H² each constituting a mold-section, one at the center and one toward each end. Through the bases of the sockets are openings $i$. The mold-sections H² may be cylindrical, as shown, or of any other desired shape in cross-section. In each mold-section H² is a plunger H³, having a head $i'$ and a shank or stem $i^2$. The head $i'$ is of the shape in cross-section of the mold-socket H² and fits therein with sufficient looseness to slide readily. The stem $i'$ of each plunger passes through an opening $i$. Journaled in the free end of the stem of each plunger is an antifriction-roller $i^3$, and confined between a shoulder $i^4$ on the stem and the adjacent under surface of the link is a retracting-spring $i^5$. I prefer to form the head of each plunger with a concave upper face $i^6$, as shown. The tendency of the springs $i^5$ is to draw the heads of the plungers into the bases of the mold sections or sockets, and the capacity of each mold is governed by the distance of the plunger-head from the top of the socket when the spring has lowered the head to the lowest limit in the socket. To properly limit the capacity of the mold-sockets, I provide shims $i^8$ between the plunger-head and socket-base. These shims may be increased in number in each instance to limit the capacity of the socket or be diminished in number to increase said capacity, as desired. Between the sockets H² the links may be hollow, as shown, to save metal and render them lighter, and at opposite sides of each of the openings $i$ the links present on their under sides bearing-surfaces $i^7$. The links correspond in width to the size of the polygonal spaces forming the peripheral faces of the drums D' E', and the chain H is stretched around said drums to bear closely against said polygonal faces, whereby the turning of the drum D' drives the chain and turns the drum E'. The shaft E of the drum E' is mounted in journal-boxes $k$, (indicated by dotted lines in Fig. 2,) which journal-boxes may be adjusted in a common manner, as by means of the adjusting-screws $k'$, longitudinally of the frame of the machine. Thus the belt or chain may be tensioned by adjusting the shaft E toward or away from the shaft D. The plunger shanks or stems $i^2$ in the movement of the belt pass freely through the grooves or recesses E⁴ in the drums E' D' and the grooves $c$ of the bed F. In the passage of the links from the drum E' to the drum D' the under surfaces $i^7$ of the links ride upon the antifriction-rollers $d^2$ and the rollers $i^3$ of the plunger-stems ride upon the gradually-rising inclined plane formed by the surfaces $c'$ and wearing-plates $c^4$. In their movement along the inclined planes presented by the wearing-plates $c^4$ the plunger-stems are lifted comparatively slowly to raise the plunger-heads toward the mouths of the socket-molds, the raising being continued in the further movement of the roller $i^3$ along the surfaces $c'$ and upper surfaces of the arms $F^4$, all as indicated in Figs. 3 and 4. In the movement of the belt the links at the lower stretch thereof ride at their outer surfaces on the antifriction-rollers B' of the bed B. At opposite ends of the links H' are teeth $h^2$, which may be of the form shown. The shaft T is in a plane somewhat higher than the shaft G. On the said shafts are drums T' G', formed with polygonal circumferential faces $T^2$ $G^2$, corresponding in size with the circumferential faces of the drums D' E' described. The drums T' G' are constructed like the drums D' E', except that they have no circumferential recesses $E^4$. At opposite ends of each of the upper drums at the centers of the flat faces are radially-projecting teeth $l$.

I is an endless belt or chain of a width corresponding with the width of the belt or chain H described. It is formed of an endless series of similarly-constructed links I', consisting of plates or strips having flat inner surfaces $m$ and outer surfaces $m'$. At opposite sides the strips or links I' are formed with perforated intermeshing projections $m^2$, at which the links are pivotally connected together by means of pins $m^3$. The projections $m^2$ are rounded at their outer ends, as shown, and fit into rounded recesses $m^4$ in the next adjacent links, so that the joints between links are close and the belt presents a substantially continuous surface $m'$. In the centers of the sides $m$ of the links I' at opposite ends are sockets $m^5$ to receive the teeth $l$ of the drum. In the faces $m'$ of the links at the center and toward opposite ends are mold-covering sections or sockets $I^2$ of the same size as and adapted to register and coöperate with the mold-sections $H^2$ of the belt H. The sockets $I^2$ may be of the same concave form as the faces $i^6$ of the plunger-heads $i'$.

Extending between the drums T' G' and mounted at opposite sides in the cheeks A is a horizontally-extending plate or support K, strengthened by cross-extending ribs K' on its upper side.

L is a suspended bed-plate extending from close to the drum G' nearly to the drum T'. Projecting upward from the upper surface of the bed L and fastened to said bed are parallel series of bolts $K^2$, passing loosely through perforations $n$ in the supporting-plate K. On the upper ends of the bolts $K^2$ are nuts $K^3$, which bear upon the support to sustain the bed L and by means of which the bed may be raised and lowered for adjustment. Surrounding the bolts $K^2$ and confined between the supporting-plate K and upper surface of the bed L are stiff springs $K^4$, which press downward upon the bed L to cushion the same in the vertical plane. The bed is formed from its end adjacent to the drum G' to a line $p$ with a flat horizontal surface L', parallel to the surface of the bed F, and from the line $p$ to the end adjacent to the drum T' the under side of the bed L pitches upward at a slight angle to present the gradually-rising face $L^2$. In the under face of the bed L are recesses $p'$, in which are mounted antifriction-rollers $L^3$. As shown in Fig. 6, eight longitudinally-extending series of closely-adjacent rollers $L^3$ are provided, all journaled in bearings $p^2$ on the bed, whereby the under surfaces of the rollers present an angular bearing-plane parallel with the surfaces L' $L^2$, as shown.

Above the support K is a support M in a plane above and parallel with a line drawn from the center of the shaft T to the center of the shaft G, whereby it inclines slightly from the drum T' toward the drum G'. The support M is securely fastened at opposite sides to the cheeks A. It consists of a plate provided in its upper surface with grooves or recesses in which are journaled longitudinally-extending series of antifriction-rollers M'.

At opposite ends of the links I' are outward-projecting teeth $m^6$ of substantially the same shape as and adapted to engage with the teeth $h^2$ at opposite edges of the chain or belt H.

The chain or belt I fits tightly over the drums T' G', the teeth on the drums engaging the sockets $m^5$ in the links. The lower side of this chain or belt rides at its inner or upper face at the lower stretch on the surface formed by the antifriction-rollers $L^3$ of the bed L, while the upper stretch of the chain or belt I rides between the drums on the bed formed by the antifriction-rollers M'. The belt or chain I is driven by the engagement of the teeth $h^2$ of the belt H with the teeth $m^6$, and the said upper chain or belt I drives the drums T' G'.

Just beyond the drum G' and parallel therewith is a hopper N, mounted in the frame and presenting outlet-spouts N' over the paths of the mold-sections $H^2$. Mounted in each spout N' is a vertical feed-screw $N^2$, the said screws being on vertical shafts $N^3$, carrying bevel-gears $N^4$ at their upper ends. The three shafts $N^3$ are driven from a horizontal shaft $N^5$, which carries bevel-gears $N^6$, meshing with the gears $N^4$. On the shaft $N^5$ is a drive-pulley $N^7$.

Journaled in the cheeks A between the spouts N' and drum G' is a horizontal shaft P, carrying a cylindrical brush P' of a length corresponding with the width of the chain or belt H and bearing upon the same. On the shaft P is a drive-pulley $P^2$. A belt R extends around a pulley R' on the end of the drum E', over the pulley N⁷, under an idler x, and over the pulley P². Thus in the rotation of the drum E' the feed-screws N² and brush P' are rotated.

In operation the material S to be formed into briquets is fed into the hopper N by any suitable means, and in the rotation of the feed-screws N² is forced in the downward direction. The chain or belt H moves in the direction indicated by the arrow in Fig. 5, whereby the mold-sections H² are carried successively beneath the spouts N' and filled to their full capacity with the material S, the same being crowded into the molds by the feed-screws. As the molds thus filled pass along, the brush P', which rotates as indicated by the arrow in Fig. 5, brushes off the surface of the belt and cleans the same of any material lying outside the molds. As the filled mold-sections pass beneath the drum G' the companion mold-sections I² move into register with and form covers for the mold-sections H², thus completing the molds. When the rollers $i^3$ commence to travel upon the inclined planes formed by the wearing-plates $c^4$, the stems $i^2$ and plunger-heads $i'$ are forced gradually upward to compress the material S between the concave surfaces formed by the heads $i'$ and recesses I². From the drum G' to the line p the belts or chains H I move in parallel planes and the compression ceases when the respective link I passes beyond the said line p, from which line the upper belt moves gradually in an upward-inclined direction away from the belt H, as shown in Figs. 3 and 4. The angle of the bed formed by the rollers L³ is greater with relation to the belt H than the angle of the inclined planes c'. Therefore the movement of the mold-sections $i^2$ in opening the molds is more rapid than that of the plungers H³. The compression is produced by the inclined planes at the wearing-plates $c^4$ and is withstood by the cushioned bed L. After passing the line p the plungers H³ continue to move in the direction of the mouths of the molds, so that when the rollers $i^3$ reach the ends of the arms F⁴ the plungers have moved so nearly to said mouths that the briquets S' are discharged. This discharge is aided by the centrifugal force in the movement of the belt around the drum D'. The surfaces of the belts are close enough together during the compressing operation to confine the material S; but there is sufficient space between them to permit any air incorporated with the granular or pulverulent material to escape freely. The plunger-heads $i'$ fit the socket-molds with sufficient closeness to prevent the material S from passing between them; but they also allow air to escape in the downward direction around the plunger-heads. Thus as the compression is brought about in a manner comparatively slow the air associated with the material S will escape instead of being confined and compressed with said material.

The springs K⁴ are sufficiently stiff to cause the bed L to be unyielding to a degree which will withstand the force necessary to bring about desired compression of the briquets. In the event that material should lodge between the belt-surfaces, however, the bed L will yield to permit the belts to slide freely and prevent binding between them. The various roller-beds over which the belts pass operate to reduce friction to a minimum, thus greatly diminishing the power requirements, and the beds B and M serve to sustain and steady the return stretches of the belts.

Although I have shown and described a machine having three endless series of molds, the number may be increased or diminished, if desired. The feed-screws may be operated to deliver and crowd the material into the mold-sections no faster than necessary to insure the proper filling and initial packing of the material therein, so that the briquets when made will be uniform in size and density. The capacity of the molds may be increased or diminished by reducing or adding to the number of shims $i^8$ in each, and to render this operation easy the heads or casters $i^9$, in which the rollers $i^3$ are journaled, are removably fastened to the stems by means of removable pins $i^{10}$. Substantially all the wear upon the inclined planes will be at the wearing-strips $c^4$, which are removably fastened in place by screws $c^5$, as shown in Fig. 10. If a greater degree of compression is desired, strips $c^4$ may be provided of greater thickness toward the point or line p, where the final compression takes place. By reason of the fact that the plungers must travel nearly the entire length of the wearing-strips to form the briquets the compression upon the material S is comparatively slow. Therefore even when the machine is operated at comparatively high speed the compression will be so gradual that all air incorporated with the material can escape between the joints of the mold, thus insuring the production of uniform and flawless briquets.

The construction shown and described may obviously be modified in the matter of details without departing from the spirit of my invention as defined by the claims.

What I claim as new, and desire to secure by Letters Patent, is—

1. In a briqueting-machine, a pair of companion traveling endless belts carrying coöperating mold-sections arranged to register with each other and travel together through a prolonged course in the movement of the belts, a compressing-plunger in a member of each pair of coöperating mold-sections, and an inclined plane in the path of said plungers operating to engage and actuate the plungers in their movement along said course to form the briquets.

2. In a briqueting-machine, a pair of companion traveling endless belts carrying coöperating mold-sections arranged to register with each other and travel together through a prolonged course in the movement of the belts, compressing-plungers in the mold-sections carried by one of said belts, and an inclined plane in the path of said plungers operating to engage and actuate the plungers in their movement along said course to form the briquets.

3. In a briqueting-machine, a pair of companion traveling endless belts carrying coöperating mold-sections arranged to register with each other and travel together through a prolonged course in the movement of the belts, a compressing-plunger in a member of each pair of coöperating mold-sections, beds across which said belts move in said course during the compressing operations, and an inclined plane in the path of said plungers operating to engage and actuate the plungers in their movement along said course, to form the briquets.

4. In a briqueting-machine, a pair of companion traveling endless belts carrying coöperating mold-sections arranged to register with each other and travel together through a prolonged course in the movement of the belts, a compressing-plunger in a member of each pair of coöperating mold-sections, beds across which said belts move in said course during the compressing operations, and an inclined plane in the path of said plungers operating to engage and actuate the plungers in their movement along said course, to form the briquets, one of said beds being yielding.

5. In a briqueting-machine, upper and lower horizontally-disposed companion traveling endless belts carrying coöperating mold-sections arranged to register with each other and travel together through a prolonged course in the movement of the belts, compressing-plungers in the mold-sections carried by the lower said belt, and an inclined plane within the vertical plane bounded by said lower belt in the path of said plungers and operating to engage and actuate the plungers in their movement along said course to form the briquets.

6. In a briqueting-machine, a pair of companion traveling endless belts carrying coöperating mold-sections arranged to register with each other and travel together through a prolonged course in the movement of the belts, a compressing-plunger in a member of each pair of coöperating mold-sections, said plungers having stems and antifriction-rollers on the ends of the stems, and an inclined plane in the path of said rollers operating to engage the same and actuate the plungers, in their movement along said course to form the briquets.

7. In a briqueting-machine, a pair of traveling belts, each formed of an endless series of pivotally-connected links formed with mold-sections, the mold-sections in the links of one belt registering and coöperating with companion mold-sections in the links of the other belt and remaining in close relation through a prolonged course in the movement of the belts, a compressing-plunger in a member of each pair of coöperating mold-sections, and an inclined plane in the path of said plungers operating to engage and actuate the plungers in their movement along said course to form the briquets.

8. In a briqueting-machine, a pair of traveling belts each formed of an endless series of pivotally-connected links formed with mold-sections, the mold-sections in the links of one belt registering and coöperating with companion mold-sections in the links of the other belt and remaining in close relation thereto through a prolonged course in the movement of the belts, compressing-plungers in the mold-sections of one said series of links, and an inclined plane in the path of said plungers operating to engage and actuate the plungers in their movement along said course to form the briquets.

9. In a briqueting-machine, a pair of upper and lower horizontally-disposed traveling belts each formed of an endless series of pivotally-connected links formed with mold-sections, the mold-sections in the links of one belt registering and coöperating with companion mold-sections in the links of the other belt and remaining in close relation thereto through a prolonged course in the movement of the belts, compressing-plungers in the mold-sections of the lower said belt, and an inclined plane in the path of said plungers operating to engage and actuate the plungers in their movement along said course to form the briquets.

10. In a briqueting-machine, the combination with means for feeding thereto the material to be briqueted, of a pair of companion traveling endless belts carrying coöperating mold-sections, supporting-shafts toward opposite ends of the machine around which the belts travel, guide-beds for the belts between the shafts, so arranged that the belts move in closely adjacent parallelism through a prolonged course between the shafts and then recede from each other as they near the shaft at the delivery end of the machine, compressing-plungers in the mold-sections carried by one said belt, and an inclined plane in the path of said plungers operating to engage and actuate the plungers in their movement along said course, whereby the plungers while the mold-sections are together, form the briquets, and, in their further travel along said inclined plane beyond the point where the mold-sections commence to recede from each other, the plungers discharge the briquets, substantially as set forth.

11. In a briqueting-machine, the combination with means for feeding thereto the material to be briqueted, of upper and lower companion traveling endless belts, carrying coöperating mold-sections, supporting-shafts toward opposite ends of the machine around which the belts travel, guide-beds for the belts between the shafts so arranged that the belts move in closely adjacent parallelism through a prolonged course between the shafts and then recede from each other as they near the shafts at the delivery end of the machine, compressing-plungers in the mold-sections carried by the lower said belt, and an inclined plane in the path of said plungers operating to engage and actuate the plungers in their movement along said course, whereby the plungers, while the mold-sections are together, form the briquets, and, in their further travel along said inclined plane beyond the point where the mold-sections commence to recede from each other the plungers discharge the briquets, substantially as set forth.

12. In a briqueting-machine, lower and upper shafts toward opposite ends of the machine, a drive-belt extending around said lower shafts formed with mold-sections, plungers in said mold-sections, a guide-bed for the upper stretch of said lower belt extending between said lower shafts, an inclined plane between said lower shafts in the path of said plungers operating to engage and raise said plungers in their movement along the path of the upper stretch of said lower belt, feed mechanism for the material to be briqueted operating to fill the mold-sections of said lower belt in the movement thereof, an upper belt traveling around said upper shafts carrying mold-covering sections, a guide-bed for said upper belt having a guide-surface parallel with the lower belt, and a receding guide-surface at an angle to said lower belt, whereby, in the movement of the belts from the said feed mechanism, the mold-covering sections register and travel in closely adjacent parallelism with said mold-sections through a prolonged course extending part way between said shafts, and then recede from said mold-sections to open the molds, the plungers operating by engagement with said inclined plane to compress the briquets while the molds are closed, and discharge them after the molds are opened, substantially as set forth.

13. In a briqueting-machine, a traveling belt formed of an endless series of pivotally-connected links having sockets forming mold-sections, and openings at the bases of said sockets, plungers having heads in said sockets and stems working in said openings, in combination with an inclined plane in the path of said stems operating to engage and advance the plungers in the movement of said belt to compress the briquets, and a companion traveling belt having mold-covering sections supported to move parallel with and coöperating with said mold-sockets during the compressing operation.

14. In a briqueting-machine, a traveling belt formed of an endless series of pivotally-connected links having sockets, forming mold-sections, and openings at the bases of said sockets, plungers having heads in said sockets and stems working in said openings, and rollers on said stems, in combination with an inclined plane in the path of said rollers operating to engage the same and advance the plungers in the movement of the belt, to compress the briquets, and a companion belt having mold-covering sections supported to move parallel with and coöperating with said mold-sockets during the compressing operation.

15. In a briqueting-machine, a traveling belt formed of an endless series of pivotally-connected links having sockets, forming mold-sections, and openings at the bases of said sockets, plungers having heads in said sockets, stems working in said openings, and plunger-retracting springs on said stems, in combination with an inclined plane in the path of the ends of said stems operating to engage and advance the plungers in the movement of the said belt to compress the briquets, and a companion traveling belt having mold-covering sections supported to move parallel with and coöperate with said mold-sockets during the compressing operation.

16. In a briqueting-machine, a traveling belt formed of an endless series of pivotally-connected links having sockets forming mold-sections, and openings at the bases of said sockets, plungers having heads in said sockets and stems working in said openings, in combination with an inclined plane in the path of the ends of said stems operating to engage and advance the plungers in the movement of said belt to compress the briquets, a companion traveling belt having mold-covering sections supported to move parallel with and coöperate with said mold-sections during the compressing operation, and guide-beds across which the belts move in the compressing operation.

17. In a briqueting-machine, a traveling belt formed of an endless series of pivotally-connected links having sockets forming mold-sections, and openings at the bases of said sockets, plungers having heads in said sockets and stems working in said openings, in combination with an inclined plane in the path of the ends of said stems operating to engage and advance the plungers in the movement of said belt to compress the briquets, a companion traveling belt having mold-covering sections supported to move parallel with and coöperate with said mold-sections during the compressing operation, and guide-beds across which the belts move in the compressing operation, one of said guide-beds being yielding.

18. In a briqueting-machine, a traveling belt formed of an endless series of pivotally-connected overlapping links having sockets, forming mold-sections, and openings at the bases of said sockets, plungers having heads in said sockets and stems working in said openings, in combination with an inclined plane in the path of the ends of said stems operating to engage and advance the plungers in the movement of said belt to compress the briquets, feeding mechanism for the material to be formed into briquets above the path of said belt toward one end, and a companion traveling belt having mold-covering sections supported to move parallel with and coöperate with said mold-sockets during the compressing operation.

19. In a briqueting-machine, a pair of traveling belts each formed of an endless series of pivotally-connected links, a plurality of adjacent-lying mold-sections in the links of one belt registering and coöperating with companion mold-sections in the links of the other belt and remaining in close relation thereto through a prolonged course in the movement of the belts, a compressing-plunger in a member of each pair of coöperating mold-sections, and inclined planes in the paths of said plungers operating to engage and actuate the plungers in their movement along said course to form the briquets.

20. In a briqueting-machine, a pair of upper and lower traveling belts each formed of an endless series of pivotally-connected links formed with mold-sections, the mold-sections in the links of one belt registering with and coöperating with companion mold-sections in the links of the other belt and remaining in close relation thereto through a prolonged course in the movement of the belts, compressing-plungers in the mold-sections of one said series of links, an inclined plane in the path of said plungers operating to engage and actuate the plungers in the movement along said course to form the briquets, a feed-spout above the path of said plunger-carrying mold-sections toward one end, and a brush engaging said plunger-carrying mold-sections beyond said spout, substantially as and for the purpose set forth.

21. In a briqueting-machine, a pair of upper and lower traveling belts each formed of an endless series of pivotally-connected links formed with mold-sections, the mold-sections in the links of one belt registering with and coöperating with companion mold-sections in the links of the other belt and remaining in close relation thereto through a prolonged course in the movement of the belts, compressing-plungers in the mold-sections of one said series of links, an inclined plane in the path of said plungers operating to engage and actuate the plungers in the movement along said course to form the briquets, a feed-spout above the path of said plunger-carrying mold-sections toward one end, a brush engaging said plunger-carrying mold-sections beyond said spout, and a rotary feed-screw in said spout.

22. In a briqueting-machine, the combination of a lower traveling belt formed with mold-sections and plungers therein, an upper traveling belt formed with mold-covering sections, a bed having a bearing-surface for the lower belt across which it moves in the briquet-forming operation, an inclined plane in said bed in the path of said plungers, and a bed for the upper belt having a bearing-surface parallel with the bearing-surface of said lower-belt bed, across which said upper belt moves in the briquet-forming operation.

23. In a briqueting-machine, the combination of a lower traveling belt formed with mold-sections and plungers therein, an upper traveling belt formed with mold-covering sections, a bed provided with antifriction-rollers forming a bearing-surface for the lower belt across which it moves in the briquet-forming operation, an inclined plane in said bed in the path of said plungers, and a bed for the upper belt having a bearing-surface parallel with the bearing-surface of said lower-belt bed across which said upper belt moves in the briquet-forming operation.

24. In a briqueting-machine, the combination of a lower traveling belt formed with mold-sections and plungers therein, an upper traveling belt formed with mold-covering sections, beds for both said belts provided with antifriction-rollers presenting parallel bearing-surfaces for said belts across which they move in the briquet-forming operation, and an inclined plane in the path of said plungers operating substantially as and for the purpose set forth.

25. In a briqueting-machine, the combination of a lower traveling belt formed with mold-sections and plungers therein, a guide-bed for said belt formed of series of antifriction-rollers extending in the horizontal plane, an upper traveling belt formed with mold-covering sections, a guide-bed for said upper belt having series of antifriction-rollers presenting a bearing-surface for the belt parallel with said lower belt, and a bearing-surface for said upper belt at an angle to said lower belt, and an inclined plane in the path of said plungers, all constructed to operate substantially as and for the purpose set forth.

WILLIAM A. KÖNEMAN.

In presence of—
L. HEISLAR,
ALBERT D. BACCI.